Dec. 30, 1930.  H. STEPPÉ ET AL  1,787,177
MOLD FOR MANUFACTURING BOOTS, SHOES, AND SIMILAR
ARTICLES OF RUBBER OR OTHER PLASTIC MATERIAL
Filed Sept. 29, 1928
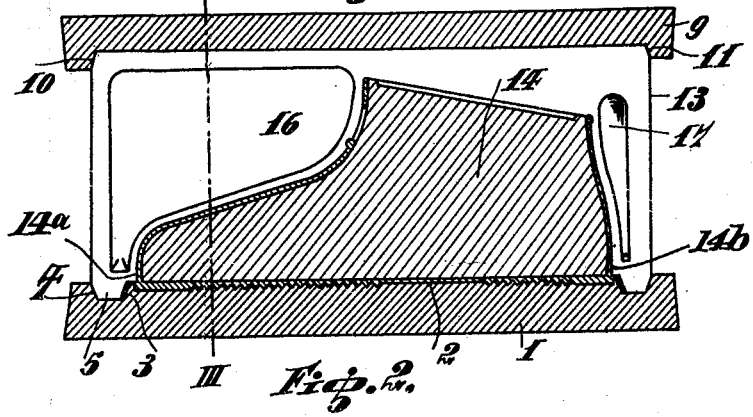
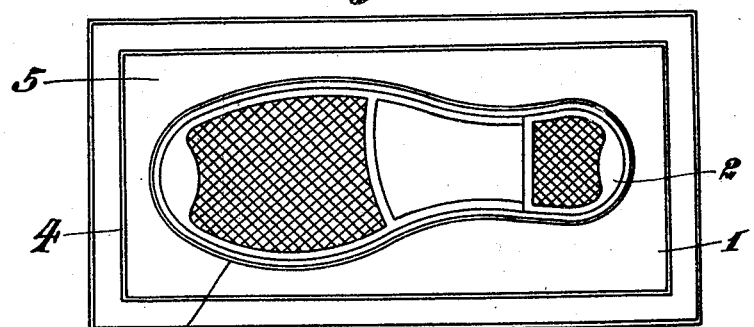
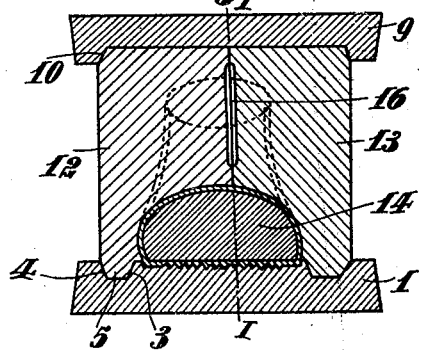
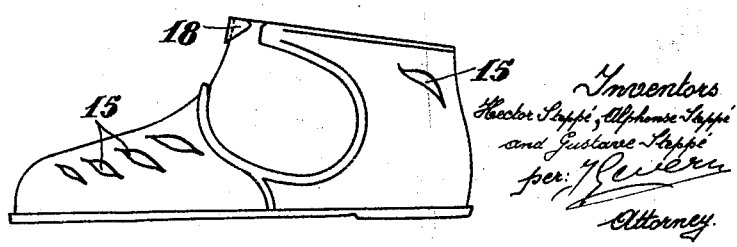
Inventors
Hector Steppé, Alphonse Steppé
and Gustave Steppé
per:
Attorney Patented Dec. 30, 1930

1,787,177

UNITED STATES PATENT OFFICE

HECTOR STEPPÉ, ALPHONSE STEPPÉ, AND GUSTAVE STEPPÉ, OF BERCHEM-STE. AGATHE, NEAR BRUSSELS, BELGIUM

MOLD FOR MANUFACTURING BOOTS, SHOES, AND SIMILAR ARTICLES OF RUBBER OR OTHER PLASTIC MATERIAL

Application filed September 29, 1928, Serial No. 309,202, and in Belgium March 26, 1928.

The invention relates to a mold for manufacturing boots, shoes, sandals, galoshes, bathing shoes, snowboots and other similar articles of rubber or rubber combined with leather or with another material used in the manufacture of such articles.

The invention more particularly relates to molds of the type comprising four separable parts, a top or cover, a bottom and two lateral parts or side molds inserted between said bottom and said cover and adapted to be brought close together, in such a way as to embrace a last covered with the required rubber sheets to form the boot, shoe or other article, the inner surfaces of said bottom, cover and side molds being hollowed out or concaved to conform with the contour of the sole and upper of the boot, shoe or the like. The lateral parts of the mold or side molds are assembled with the bottom and top parts thereof, through the medium of bevelled edges forming part of the side molds and engaging correspondingly bevelled edges formed on the bottom and top parts, in such a way that a pressure exerted on said bottom and top parts, at right angles thereto, will bring the side molds nearer and tightly close to each other.

With a mold according to the invention, boots, shoes or like articles will be formed and vulcanized in one operation, the articles being completely finished and requiring no seaming or pasting. The pressure may be applied to the mold by any ordinary press acting at right angles to the bottom and top parts of the mold.

The accompanying drawings illustrate, by way of example, an embodiment of the invention.

Fig. 1 is a vertical longitudinal sectional view of the mold, on line I—I of Fig. 3;

Fig. 2 is a plan view of the bottom or base of the mold on which a sole is to be placed;

Fig. 3 is a transverse sectional view on line III—III of Fig. 1;

Fig. 4 is a side view of a finished shoe with the last as it appears after it has been removed from the mold.

On the bottom 1, hollowed out to conform with the contour to give to the sole of the shoe, is placed a non-vulcanized sheet of rubber, upon which will bear the last 14, surrounded by two sheets of rubber previously cut so as to form therein the apertures to conform with the design of the finished shoe. These sheets of rubber laterally surround the last 14 and meet at the front tip 14a and back tip 14b thereof.

The bottom 1 is provided with a groove 5, in which engage the side molds 12 and 13, which laterally embrace the last 14 and are concaved to conform with the contour of the last. To enable the side molds 12 and 13 to fit exactly in the groove 5, the side walls 3 and 4 of the latter are inclined. Said groove may be used to receive the excess of rubber driven out of the mold during vulcanization. The side molds 12 and 13 are both provided on their adjacent faces with two shallow recesses 16 and 17, which may also receive the excess of rubber driven out by the pressure during vulcanization. On the side molds 12 and 13 is then placed a cover 9, having a bevelled flange 10, cooperating with suitable bevels on the upper edge of the side molds 12 and 13.

The operation of the mold is as follows: A sheet or band of non-vulcanized rubber and approximately cut to the size of the contour of the sole is placed upon the upper face of the bottom 1 of the mold. On the inner face of the side mold 13 is also arranged a sheet of non-vulcanized rubber or other rubber previously cut to conform with the design of the upper or the leg of the shoe. This sheet of rubber is maintained in position by means of the last 14; then the whole is placed on the sheet of rubber placed upon the bottom 1. The outer face of the last 14, adjacent the side mold 12, is also provided with a sheet of rubber previously cut to shape and maintained in position by the side mold 12 engaging in the groove 5. Upon the parts assembled in this manner is disposed the cover 9. The tightening of the mold is then effected by means of a hydraulic or other press and the vulcanization is produced in the usual way. Under the high pressure acting upon the mold, a part of the excess of the rubber flows either into the recesses 16 and 17 or into the groove 5. When unmolding, the small films of rubber thus produced are taken away and a shoe similar to that shown on Fig. 4 is obtained. In order to obtain the apertures 15 and the strap 18 indicated on said Fig. 4, the side molds 12 and 13 may be provided with projecting parts suitable for the purpose. It is to be understood that these apertures can be of any convenient design.

In the manufacture of shoes with a rubber sole and heel combined with a leg of leather or of other material, the legs are arranged on the last in such a manner that the leather comes in contact with the sheet of rubber placed on the bottom of the mold, but in order to prevent the heat of the vulcanization from injuring the leather, an inner circulation of cooling water for the side molds 12 and 13 is provided.

The mold may be made of cast iron, aluminium or any other metal.

We claim:

1. A mold of several parts for manufacturing boots, shoes and like articles of footwear of rubber or like plastic material, comprising top and bottom mold plates through which pressure is applied in molding, two side mold blocks, the oppositely disposed faces of which are hollowed out to conform with the upper of the footwear, a continuous recess in the inner face of said top mold plate for engagement by the top face of the side blocks, a recess in the inner face of said bottom mold plate for engagement by the bottom face of the side blocks and of such shape as to enclose in its center an outstanding portion for supporting the sole of the footwear, bevelled edges on both side mold blocks and both recesses cooperating in such a way that the side mold blocks move inwardly on pressure being applied, and a last independent of the mold blocks and plates and adapted to be placed on the sole of the footwear.

2. A mold of several parts for manufacturing boots, shoes and like articles of footwear of rubber or like plastic material, comprising top and bottom mold plates through which pressure is applied in molding, two side mold blocks, the oppositely disposed faces of which are hollowed out to conform with the upper of the footwear, a continuous recess in the inner face of said top mold plate for engagement by the top face of the side blocks, a recess in the inner face of said bottom mold plate for engagement by the bottom face of the side blocks and of such shape as to enclose in its center an outstanding portion for supporting the sole of the footwear, bevelled edges on both side mold blocks and both recesses cooperating in such a way that the side mold blocks move inwardly on pressure being applied, cavities in the oppositely disposed faces of the side mold blocks on both sides of the footwear and adapted to register on pressure being applied, and a last independent of the mold blocks and plates and adapted to be placed on the sole of the footwear.

3. A mold of several parts for manufacturing boots, shoes and like articles of footwear of rubber or like plastic material, comprising top and bottom mold plates through which pressure is applied in molding, two side mold blocks, the oppositely disposed faces of which are hollowed out to conform with the upper of the footwear, a continuous recess in the inner face of said top mold plate for engagement by the top face of the side blocks, a recess in the inner face of said bottom mold plate for engagement by the bottom face of the side blocks and of such shape as to enclose in its center an outstanding portion for supporting the sole of the footwear, bevelled edges forming the confines of the top and bottom recess and of the outstanding inner portion of the latter, bevelled parts at both the upper and lower ends of the outer face of the side mold blocks and at the lower end of the inner face thereof cooperating with said bevelled edges, in such a way that the side mold blocks move inwardly on pressure being applied, and a last independent of the mold blocks and plates and adapted to be placed on the sole of the footwear.

In testimony whereof we signed hereunto our names.

ALPHONSE STEPPÉ.
GUSTAVE STEPPÉ.
HECTOR STEPPÉ.